United States Patent [19]

Steinman

[11] 3,727,502
[45] Apr. 17, 1973

[54] SAW-TABLE CONSTRUCTION

[76] Inventor: Abraham Steinman, 125 Croyden Court, Long Island, N.Y. 11507

[22] Filed: May 6, 1971

[21] Appl. No.: 140,805

[52] U.S. Cl.....................83/471.3, 83/522, 83/523
[51] Int. Cl...........................B27b 5/20, B27b 27/08
[58] Field of Search......................143/6 G, 6 R, 169, 143/6 E, 47 F

[56] References Cited

UNITED STATES PATENTS

| 3,384,135 | 5/1968 | Frydenlund | 143/6 G |
| 3,389,724 | 6/1968 | Paul | 143/6 G |
| 2,599,893 | 6/1952 | Butler | 143/6 G |
| 3,521,683 | 7/1970 | Kirkpatrick | 143/169 |
| 1,789,125 | 1/1931 | Wilderson | 143/169 |
| 2,488,077 | 11/1949 | Buday | 143/6 E |
| 3,485,275 | 12/1969 | Boudreau | 143/6 G |

*Primary Examiner*—Donald R. Schran
*Attorney*—Sandoe, Hopgood and Calimafde

[57] ABSTRACT

The invention contemplates a saw-table construction with frame and slide features so devised as to accommodate a portable motorized saw or the like tool and to enable selective rip, cross-cut, mitering and other standard operations without requiring any remount of the tool, even if the tool is a circular saw. Provision is made for accommodating a variety of positioning adjustments of the tool with respect to the work, without having to change the basic mounting of the tool.

25 Claims, 4 Drawing Figures

PATENTED APR 17 1973 3,727,502
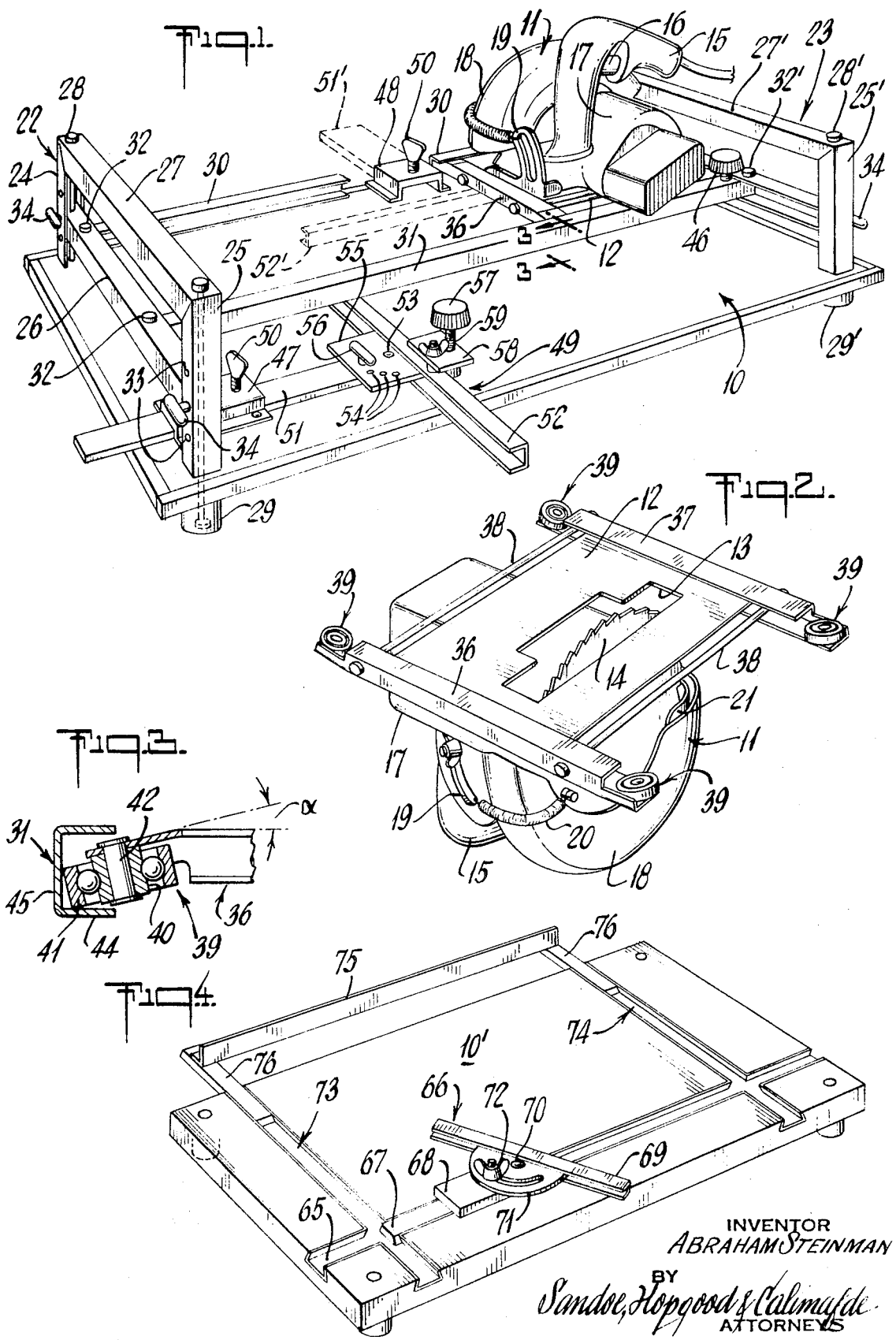
INVENTOR
ABRAHAM STEINMAN
BY
Sandoe, Hopgood & Calimafde
ATTORNEYS

SAW-TABLE CONSTRUCTION

The invention relates to a saw table particularly suited to accommodation of a standard portable power tool, such as a circular saw.

It is an object of the invention to provide an improved device of the character indicated.

Another object is to provide a saw table which will substantially improve the accuracy and eliminate certain hazards of the conventional power saw.

A further object is to achieve the foregoing objects with a structure which inherently lends itself to the performance of the most frequently needed cutting operations, e.g., rip, cross-cut, and miter, without requiring any remount or re-setting of the saw in its installed position in the saw-table structure.

It is a general object to achieve the above objects with basically simple and inexpensive structure, which is easily assembled from knocked-down condition, and which is readily adapted to accommodation of a wide variety of types and sizes of commercially available portable power tools, including circular saws.

Other objects and various further features of novelty and invention will be pointed out or will occur to those skilled in the art from a reading of the following specification in conjunction with the accompanying drawings. In said drawings, which show, for illustrative purposes only, preferred forms of the invention:

FIG. 1 is a perspective view of a saw table of the invention, with a standard portable power saw installed therein, and with certain parts broken-away to reveal further detail;

FIG. 2 is a perspective view of the portable saw and its slide structure, removed from the table of FIG. 1 and inverted for a better viewing of parts;

FIG. 3 is an enlarged fragmentary sectional view at the plane 3—3 of FIG. 1; and FIG. 4 is a perspective view of the base of another table, representing a modification of that shown in FIG. 1.

Briefly stated, the invention contemplates a saw-table construction with frame and slide features so devised as to accommodate a portable motorized saw or the like tool and to enable selective rip, cross-cut, mitering and other standard operations without requiring any remount of the tool, even if the tool is a circular saw. Provision is made for accommodating a variety of positioning adjustments of the tool with respect to the work, without having to change the basic mounting of the tool.

Referring to FIGS. 1 to 3 of the drawings, the invention is shown in application to a saw table comprising a flat horizontal rectangular base 10, which is preferably a panel of plywood or other commonly available board, as of 1-inch or ¾-inch thickness. Frame and slide structure carried by base 10 removably accommodates the mounting of a power saw 11, which may be one of a variety of standard portable machines which are commercially available. Generally, such machines comprise a sole plate 12 having a suitable opening through which the cutting element 14 projects, to a projecting extent determined by adjustable means forming part of the commercial machine; such adjustable means is not shown in the drawings and forms no part of the present invention, but the inherent features of such adjustment are unimpeded by and are, therefore, available for use with the structure of the present invention, as will later be clear. Other standard elements of the machine 11 include a handle or grip 15 with trigger switch 16 for start-stop control of an electric motor within housing 17, blade-guard means 18, and a blade-tilt or bevel-adjustment clamp 19; all of these standard features are used in the saw table of the invention. If desired, a spring 20 may be used to hold, in retracted position, the movable blade guard 21 which normally covers the projecting part of the cutting element or blade 14.

The basic supporting structure for machine 11 comprises two like spaced upstanding frames 22–23 between which work and saw are to be accommodated on and above the base 10. Since these frames 22–23 are duplicates, a description of frame 22 will suffice, primed notation being used for corresponding parts at frame 23. Basically, spaced upstanding columns 24–25 are secured at or near corners of base 10, and a horizontal bar 26 is carried by columns 24–25 at such spacing from base 10 as to clear the work thickness. In the form shown, great rigidity is achieved with economy of parts, by fixedly connecting the upper end of columns 24–25, using a single elongated bar member 27 (which may be a heavy extruded-aluminum channel), from which the columns 24–25 are integrally formed as suitably mitered, bent ends. Tie-rod or bolt means 28 is received within each column and passes through the upper connection 27 as well as base 10, compressionally loading the anchorage of the end frame to base 10; as shown, means 28 also serves to fasten foot elements 29 beneath base 10 at each corner.

The horizontal bars 26–26' are interconnected by spaced elongated parallel guide members 30–31, the same being conveniently of heavy-gage extruded aluminum, with channel openings in mutually facing relation; these channel openings define rails or tracks for the traverse guidance of machine 11. Bars 26–26' are also shown as channels, in which the ends of rails 30–31 are received and secured, as by bolts 32. The entire secured structure 26–26'–30–31 may be selectively elevated and secured to columns 24–25–24'–25', depending on work-thickness require-ments. As shown, plural fixed formations, such as holes 33, in each column, provide means whereby pin or bolt means 34 may reference the ends of bars 26–26' to the selected elevation formation or hole 33. For any finer adjustment of cutting-blade elevation with respect to the base 10, the user may rely on the adjustable features (already alluded to) of machine 11.

As best seen in FIG. 2, the means whereby the sole plate 12 of machine 11 is guided by rails 30–31, is an adapter frame or slide, comprising spaced parallel channel members 36–37, preferably of stainless steel and adapted to receive opposed end edges of the sole plate 12. Members 36–37 project beyond both side edges of the sole plate 12, and tie rods or bolts 38 adjacent these edges rigidly clamp the adapter slide to the machine 11. The ends of members 36–37 project still further into guided engagement with the channels of rails 30–31; and preferably, rollers 39 at these ends make for free-running guided action. As shown (see also FIG. 3), each roller 39 is a ball bearing comprising inner and outer race rings 40–41, with a complement of balls therebetween. The underside of each end of channels 36–37 is cut-away, and the remainder of the end is slightly canted, as at an angle α intermediate the horizontal and the vertical, so that when the inner bearing ring 40 is fixedly pinned at 42 to the canted channel flange 43, the outer bearing ring 41 may derive both vertical support from the horizontal rail flange 44 and lateral horizontal guidance from the contiguous vertical flange portion or web 45 of the guide rail. I have obtained excellent operation for a selected angle α in the range of 5° to 10°. When guided traverse of the saw is not desired, as in a rip cut, a single clamp screw and knob 46 is selectively operable to engage and retain part of the slide structure to one of the guide rails (31).

The base 10 preferably includes work-guide means suitable to the variety of desired cuts, for example, on each of the orthogonally related axes used to permit basic rip and cross-cut operations. In FIG. 1, two such guide means are shown, at 47–48, with similar proportions and dimensions, so as to permit selective employment of a single fence structure 49 in either of the guide means 47–48. Each guide means 47 (48) is an inverted channel secured to base 10 and with its own clamp screw 50. The fence 49 comprises two articulated members 51–52, pivoted to each other at 53, and incorporating selectively operable clamp means for securing a desired angular relation. As shown, plural formations such as holes 54 in a plate 55 carried by member 52 provide ready selection of particular pivot-angle relations, e.g., for 90° between members 50–51, as well as for 0°, and the 30, 45, and 60 degree positions on opposite sides of the 90° position; pin or bolt means 56 through a selected hole 54 to member 51 secures the selected angular relation. The member 51 is sized for guided positioning in the channel of either of guide means 47–48, being shown clamped at means 47; the phantom outlines 51'–52' suggest the orientation of fence 49 when clamped at 48. In either event, fence 49 is clamped in such manner as to be restrained against elevating movement, even when a hold-down element 57, if desired, is adjustably set to retain the work firmly against the base and fence. As shown, the hold-down element 57 carried by a bracket 58, is removably secured by means 59 to fence member 52, and member 52 is conveniently a straight channel with one of its side walls flat against base 10.

In the modification of FIG. 4, the orthogonally related work-guide means are recessed in the base 10' and therefore provide no obstruction to work manipulation. Thus, a first such guide means may be a dovetail-routed channel, preferably lined with a conforming metal channel 65, corresponding to the alignment of guide means 47 in FIG. 1, and extending the full length of base 10'. The fence unit 66 served by channel 65 includes an elongated dovetail member 67 slidable in channel 65 and an upper body 68 to which the fence member 69 is pivoted at 70. An arcuately slotted plate 71 carried by member 69 accommodates clamp means 72 whereby a selected angular relation may be retained.

Similarly lined work-guide means may serve fence 66 on the orthogonally related guide axis, but in the form shown two spaced parallel guide means 73–74 are provided, orthogonal to means 65. An elongated rip fence 75 includes two fixed parallel dovetail guide members 76–76' for positioning engagement along means 73–74. Clamp means (not shown) will be understood to releasably secure one or both of the fences 66–75 in a selected position along its guide means (65–73–74).

In use, the clamp means 46 is normally released, but is set for rip cuts in which the work is fed through the table. To perform such a cut, the fence means 49 is set at guide means 48, with member 52 aligned parallel to and at the desired offset from the cutting alignment of blade 14, the hand screws or clamps 50–56 holding a rip-fence position. The machine 11 is started, and an elongated work piece to be ripped is fed through the space beneath bar 26 and in aligning reference to the rip fence, suggested at 52'. The ripped ends pass completely through the table, on base 10 and beneath the remote bar 26', until the rip cut is completed.

For a cross-cut, the clamp 46 is released, to permit hand-driven traverse via grip at 15. The fence 49 is installed in the position shown in solid outline in FIG. 1, member 52 being set for 90° with respect to its guide member 51. If desired, hold-down 57 may be set against the work, retaining the same against base 10 and referenced to fence member 52. The operator can steady his left hand against the work or to the frame member 27', as he pleases, while using his right hand to feed the saw into and back from the work. Miter cuts are similarly performed, depending upon the desired setting of a selected angle at 54–56.

The foregoing has assumed that work is to be cut all the way through, but it will be understood that dado or slotting operations may be performed with equal facility in the cross-cut or rip directions, depending upon the desired depth-setting for tool penetration in the work. Also, once such a setting has been made, as by the blade-height adjustment provided in a conventional machine 11, there is no need to change the adjustment for all the slots or grooves which are required, both with and across the grain, to complete a given job. The same applies as to cross-cut and rip operations for a given blade-tilt adjustment at 19, i.e., no adjustments of the saw are needed when changing from rip to cross-out functions, and vice versa.

It will be seen that the described invention meets all stated objects with inherent precision and unusual safety. Since important elements are clamped and the slide is precision-guided, one avoids binding in the cut, and wandering is eliminated. Even a planer or dado blade can be used with accuracy. In fact, the unit is so precise that the sort of work formerly reserved for radial-arm saws costing hundreds of dollars can be performed with even the least expensive portable saw. Accuracy in making bevels, angles, mortises, dados and other fancy cuts is limited only by the care with which the operator makes his settings.

The commercial size of my saw table, 18 inches clearance between columns of an end frame, 32 inches clearance between end frames, and 3 inches maximum adjusted base clearance beneath bars 26–26', is ample for most work. Using a portable tool 11 with blade diameters ranging between 5.5 and 10 inches, boards up to so-called "18-inch" width (i.e., just less than 18 inches), and any length, can be ripped. Boards up to 18-inch width and up to 3-inch thickness can be cross-cut (with a 9 or 10-inch diameter saw, in one pass). For other work, the machine 11 can be easily removed and replaced. With proper blades, wood, metal, plastic and stone can all be safety cut with my saw table. Safety of the unit derives from the rigid mounting and precision guidance of the machine 11, with the cutting blade shielded from the operator. Chips and sawdust are fed away from the operator, and there is no need for his hand ever to be near the cutting blade.

While the invention has been described in detail for preferred forms, it will be understood that modifications may be made without departure from the invention. For example, portable power tools other than of the circular-saw variety may be clamped by the slide-adapted structure 36–37–38, the same being facilitated if the tool in question has a rectangular sole plate. For example, a saber saw or a router may thus be positioned and mounted for guided traverse movement above work held in the manner already described.

What is claimed is:

1. Saw-table structure for the guided positioning of a portable motorized saw or the like tool and work to be cut thereby, comprising a flat table base, longitudinally spaced parallel upstanding frames carried by said base and between which work and tool are to be accommodated on and above said base, each of said frames comprising two transversely spaced upstanding end columns and an elongated horizontal transverse bar held by and between said columns in vertically spaced parallel relation to said base, thereby establishing similar relatively wide open and generally orthogonally related work-receiving and alignment regions in the generally horizontal plane beneath said bars, transversely spaced longitudinally extending parallel guide members carried by and longitudinally connecting said bars on a longitudinal guide axis, and cutting means including a portable motorized tool having a sole plate guided by and between said guide members with the cutting axis of the saw parallel to the guide axis and having a cutting-tool element projecting into the work-receiving space on said table and beneath said guide members; whereby, for work positioned on said base and beneath said guide members and between said frames, cross-cut operation is available by traversing the motor-driven cutting element along said guide members and whereby, for base-supported work oriented to pass beneath one or both of said bars, rip-cut operation is available by traversing the work and cutting element with respect to each other.

2. Saw-table structure according to claim 1, in which said portable tool is a circular saw with the cutting axis of the saw parallel to the guide axis.

3. Saw-table structure according to claim 1, in which selectively operable clamp means coacts between said last-defined means and at least one of said guide members to releasably hold a selected position of the tool along said guide means.

4. Saw-table structure according to claim 1, in which said last-defined means comprises slide-frame means releasably engageable to the portable tool and having guided engagement with both said guide members.

5. Saw-table structure according to claim 4, in which said guide members are rails and said slide-frame means includes rollers riding said rails.

6. Saw-table structure according to claim 5, in which each rail includes a flat horizontal elongated flange portion contiguous to a vertical elongated flange portion, each roller being mounted to said slide-frame means on an axis of rotation that is canted between horizontal and vertical such that each roller is guided by both flange portions of the rail on which it rides.

7. Saw-table structure according to claim 4, in which said slide-frame means comprises longitudinally spaced parallel channels spanning the space between said guide members and guided thereby, the channels being oriented with their openings facing each other and adapted to insertably receive opposed ends of a portable-tool sole plate, and selectively operable clamp means coacting between said channels to clamp the same against the opposed longitudinal ends of the sole plate of a portable tool.

8. Saw-table structure according to claim 1, in which for each upstanding frame said end columns are fixedly connected at their upper ends.

9. Saw-table structure according to claim 1, in which the elongated transverse bar between end columns of each upstanding frame is adjustably positioned at a selected elevation between said base and the fixed connection of the upper ends of said columns.

10. Saw-table structure according to claim 9, in which for each upstanding frame said end columns are vertically elongated channels with their open sides in opposed facing relation, said elongated transverse bar being received in both column channels, and selectively operable means to hold a selected elevation of said bar.

11. Saw-table structure according to claim 10, in which said selectively operable means comprises corresponding vertically spaced fixed formations in all said columns, and means engaging a selected one of said formations to the adjacent end of one of said transverse bars.

12. Saw-table structure according to claim 1, in which said base includes work guide means on each of two orthogonally related axes, one of said orthogonal axes being parallel to said guide axis.

13. Saw-table structure according to claim 12, and including a work fence having guided engagement with a selected one of said work-guide means.

14. Saw-table structure according to claim 13, and a selectively operable clamp coacting between said fence and one of said work-guide means to hold a selected fence position.

15. Saw-table structure according to claim 13, in which said fence comprises pivotally articulated first and second members, the first of which has guided engagement with the selected work-guide means and the second of which is positioned at a work-engaging elevation, and selectively operable means coacting between said first and second members for retaining a selected pivoted relation.

16. Saw-table structure according to claim 1, in which said base includes work-guide means adjustably positionable on a selected one of two orthogonally related axes, one of said orthogonal axes being parallel to said guide axis.

17. Saw-table structure according to claim 16, in which said work-guide means includes pivotally articulated first and second members, one of which is secured to said base, and selectively operable means coacting between said members for retaining a selected pivoted relation.

18. Saw-table structure according to claim 17, in which said last-mentioned selectively operable means includes fixed reference stop means preselected for each of a plurality of commonly used angles including zero degrees, 45 degrees, and 90 degrees of said pivotal relation.

19. Saw-table structure according to claim 13, in which the guided engagement between said work fence and a selected one of said guide means is characterized by restraint against upward displacement of said fence with respect to said base, and work hold-down means carried by said fence.

20. Saw-table structure according to claim 8, in which for each upstanding frame said end columns are integral bent parallel ends of one rigid member, thereby defining an inverted upstanding U-shaped end frame, and a vertical tie rod passing within each of said bent parallel ends and anchoring the same to said base.

21. Saw-table structure according to claim 20, in which said tie rods are threaded and extend through the horizontally extending region of said rigid member, whereby said columns may be compressionally loaded in their anchorage to said base.

22. Saw-table structure according to claim 21, in which said base is a rectangular panel with each column mounted near a corner of said panel, and foot elements at the respective corners of the underside of said panel, said tie rods engaging said foot elements and retaining the assembled fixed relation of end frames and foot elements to said base.

23. Saw-table structure according to claim 1, in which said base is of board material.

24. Saw-table structure according to claim 1, in which selectively operable frame-based clamp means coacts with said last-defined means to releasably hold a fixed position of the tool with respect to said guide members.

25. Saw-table structure according to claim 16, in which selectively operable work hold-down means is carried by said work-guide means.

* * * * *